(12) United States Patent
Kang et al.

(10) Patent No.: US 9,382,162 B2
(45) Date of Patent: Jul. 5, 2016

(54) DIELECTRIC COMPOSITION AND MULTILAYER CERAMIC ELECTRONIC COMPONENT MANUFACTURED USING THE SAME

(71) Applicant: SAMSUNG ELECTRO-MECHANICS CO., LTD., Suwon, Gyunggi-do (KR)

(72) Inventors: Sung Hyung Kang, Gyunggi-do (KR); Doo Young Kim, Gyunggi-do (KR); Chang Hak Choi, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/842,764

(22) Filed: Mar. 15, 2013

(65) Prior Publication Data
US 2014/0092525 A1   Apr. 3, 2014

(30) Foreign Application Priority Data

Sep. 28, 2012   (KR) .......................... 10-2012-0108744

(51) Int. Cl.
*C04B 35/468* (2006.01)
*H01G 4/10* (2006.01)
(Continued)

(52) U.S. Cl.
CPC .............. *C04B 35/49* (2013.01); *C04B 35/4682* (2013.01); *C04B 35/62815* (2013.01); *H01G 4/008* (2013.01); *H01G 4/1227* (2013.01); (Continued)

(58) Field of Classification Search
CPC ... C04B 35/4682; C04B 35/49; H01G 4/1227

USPC .................................................. 501/134–139
See application file for complete search history.

(56) References Cited

U.S. PATENT DOCUMENTS

| 6,556,423 B2 | 4/2003 | Konaka et al. |
| 6,939,822 B2 * | 9/2005 | Konaka et al. ................ 501/137 |

(Continued)

FOREIGN PATENT DOCUMENTS

| CN | 1375835 A | 10/2002 |
| CN | 101641305 A | 2/2010 |

(Continued)

OTHER PUBLICATIONS

Korean Office Action issued in Application No. 10-2012-0108744 dated Oct. 29, 2013.

(Continued)

*Primary Examiner* — Karl Group
(74) *Attorney, Agent, or Firm* — McDermott Will & Emery LLP

(57) ABSTRACT

There are provided a dielectric composition and a multilayer ceramic electronic component manufactured using the same, the dielectric composition including a dielectric grain having a perovskite structure represented by $ABO_3$, wherein, when an imaginary line is drawn in a direction from a center of the dielectric grain to a grain boundary thereof, a content of rare earth elements in a region corresponding to 0.75 to 0.95% of the dielectric grain from the center of the dielectric grain may be 0.5 to 2.5 at %, based on 100 at % of a B-site ion, so that the multilayer ceramic electronic component manufactured using the dielectric composition can have excellent reliability and secure a high dielectric constant.

13 Claims, 2 Drawing Sheets

(51) Int. Cl.
   *C04B 35/49* (2006.01)
   *H01G 4/008* (2006.01)
   *H01G 4/30* (2006.01)
   *H01G 4/12* (2006.01)
   *C04B 35/628* (2006.01)

(52) U.S. Cl.
   CPC ............. *H01G4/1236* (2013.01); *H01G 4/30* (2013.01); *C04B 2235/3208* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3236* (2013.01); *C04B 2235/3249* (2013.01); *C04B 2235/3289* (2013.01); *C04B 2235/79* (2013.01)

(56) References Cited

U.S. PATENT DOCUMENTS

| | | | |
|---|---|---|---|
| 8,059,388 B2* | 11/2011 | Yamazaki et al. | 361/321.4 |
| 8,208,240 B2* | 6/2012 | Yamazaki et al. | 361/321.4 |
| 8,238,077 B2* | 8/2012 | Yamazaki et al. | 361/321.4 |
| 2003/0039090 A1* | 2/2003 | Konaka et al. | 361/311 |
| 2004/0105214 A1 | 6/2004 | Nakamura et al. | |
| 2008/0226944 A1* | 9/2008 | Aman et al. | 428/697 |
| 2009/0225494 A1 | 9/2009 | Yamazaki | |
| 2010/0014214 A1* | 1/2010 | Yamazaki et al. | 361/321.4 |
| 2010/0067171 A1* | 3/2010 | Yamazaki et al. | 361/321.4 |
| 2010/0188797 A1* | 7/2010 | Yamazaki et al. | 361/303 |
| 2012/0050941 A1* | 3/2012 | Murakawa et al. | 361/321.1 |
| 2014/0098455 A1* | 4/2014 | Kang et al. | 361/301.4 |
| 2014/0098457 A1* | 4/2014 | Kang et al. | 361/305 |

FOREIGN PATENT DOCUMENTS

| | | |
|---|---|---|
| CN | 102381876 A | 3/2012 |
| JP | 2002-274936 A | 9/2002 |
| JP | 2004-189588 A | 7/2004 |
| JP | 2007-223872 A | 9/2007 |
| JP | 2008-109120 A | 5/2008 |
| JP | 2008-222520 A | 9/2008 |
| JP | 2008-222521 A | 9/2008 |
| JP | 2008-239407 A | 10/2008 |

OTHER PUBLICATIONS

Notice of Office Action JP Patent Application No. 2012-279670 dated Jul. 1, 2014 with English translation.
U.S. Office Action issued in related U.S. Appl. No. 14/572,368 on Feb. 23, 2015; 15 pages.
Notice of Office Action issued in corresponding Japanese Patent Application No. 2014-200345, mailed on Jun. 16, 2015; 11 pages with English translation.
Notification of the Second Office Action issued in corresponding Chinese Patent Application No. 201310013154.X, mailed on Jun. 24, 2015; 13 pages with English translation.
U.S. Final Office Action issued in related U.S. Appl. No. 14/572,368, mailed on Jul. 16, 2015.

* cited by examiner

B-B'

DIELECTRIC COMPOSITION AND MULTILAYER CERAMIC ELECTRONIC COMPONENT MANUFACTURED USING THE SAME

CROSS-REFERENCE TO RELATED APPLICATIONS

This application claims the priority of Korean Patent Application No. 10-2012-0108744 filed on Sep. 28, 2012, in the Korean Intellectual Property Office, the disclosure of which is incorporated herein by reference.

BACKGROUND OF THE INVENTION

1. Field of the Invention

The present invention relates to a dielectric composition having excellent dielectric properties and electrical properties and a multilayer ceramic electronic component manufactured using the same.

2. Description of the Related Art

A perovskite powder, a ferroelectric ceramic material, has been used as a raw material of electronic components, such as a multilayer ceramic capacitor (MLCC), a ceramic filter, a piezoelectric element, a ferroelectric memory, a thermistor, a varistor, and the like.

Barium titanate ($BaTiO_3$) is a high dielectric material having a perovskite structure, and has been used as a dielectric material for a multilayer ceramic capacitor.

Today, with the trend for slimness, compactness, high capacitance, high reliability, and the like, in electronic components, a ferroelectric particle is required to have a small size as well as an excellent dielectric constant and reliability.

If the particle diameter of a barium titanate powder, a main component of a dielectric layer, is large, surface roughness of the dielectric layer may be increased, and thus, a short circuit ratio may be increased and insulation resistance may be defective.

For this reason, as a main component of the dielectric layer, the barium titanate powder is required to be finely-granulated.

However, as a barium titanate powder is finely granulated and the dielectric layer of a multilayer ceramic electronic component is thinner, a reduction in capacitance, short circuit defects, reliability defects, and the like, may occur.

For this reason, the development of multilayer ceramic electronic components securing a dielectric constant in a dielectric layer and having excellent reliability is still in demand.

RELATED ART DOCUMENT (Patent Document 1) Japanese Patent Laid-Open Publication No. 2008-239407

SUMMARY OF THE INVENTION

An aspect of the present invention provides a dielectric composition having excellent dielectric properties and electrical properties and a multilayer ceramic electronic component manufactured using the same.

According to an aspect of the present invention, there is provided a dielectric composition including: a dielectric grain having a perovskite structure represented by $ABO_3$, wherein, when an imaginary line is drawn in a direction from a center of the dielectric grain to a grain boundary thereof, a content of rare earth elements in a region corresponding to 75 to 95% of the dielectric grain from the center of the dielectric grain may be 0.5 to 2.5 at %, based on 100 at % of a B-site ion.

The content of rare earth elements in the region corresponding to 75 to 95% of the dielectric grain from the center of the dielectric grain may be 0.05 to 2.0 times a content of rare earth elements in the center of the dielectric grain.

Here, the A may include one or more selected from a group consisting of barium (Ba), strontium (Sr), lead (Pb), and calcium (Ca).

Here, the B may include one or more selected from a group consisting of titanium (Ti) and zirconium (Zr).

The rare earth elements may include a trivalent ion.

The rare earth elements may include one or more selected from a group consisting of scandium (Sc), yttrium (Y), lanthanum (La), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru).

The dielectric grain may include one or more selected from a group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$); and $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$), in which one or more rare earth elements are partially dissolved.

According to another aspect of the present invention, there is provided a multilayer ceramic electronic component, including: a ceramic body including dielectric layers each having an average thickness of 0.48 μm or less; and internal electrodes disposed to face each other with the dielectric layer therebetween within the ceramic body, wherein the dielectric layer includes a dielectric composition, the dielectric composition including a dielectric grain having a perovskite structure represented by $ABO_3$, in which, when an imaginary line is drawn in a direction from a center of the dielectric grain to a grain boundary thereof, a content of rare earth elements in a region corresponding to 75 to 95% of the dielectric grain from the center of the dielectric grain is 0.5 to 2.5 at %, based on 100 at % of a B-site ion.

The content of rare earth elements in the region corresponding to 75 to 95% of the dielectric grain from the center of the dielectric grain may be 0.05 to 2.0 times a content of rare earth elements in the center of the dielectric grain.

Here, the A may include one or more selected from a group consisting of barium (Ba), strontium (Sr), lead (Pb), and calcium (Ca).

Here, the B may include one or more selected from a group consisting of titanium (Ti) and zirconium (Zr).

The rare earth elements may include a trivalent ion.

The rare earth elements may include one or more selected from a group consisting of scandium (Sc), yttrium (Y), lanthanum (La), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru).

The dielectric layer may have a dielectric constant of 4000 or greater.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
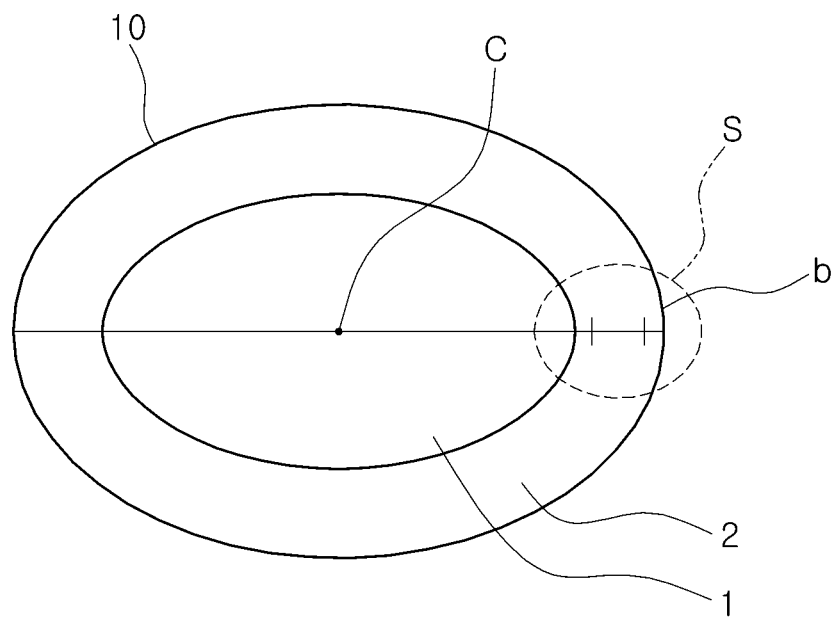
FIG. 1 is a schematic view showing a core-shell structure of a dielectric grain according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a schematic view showing a core-shell structure of a dielectric grain, according to an embodiment of the present invention.

Figure 2:
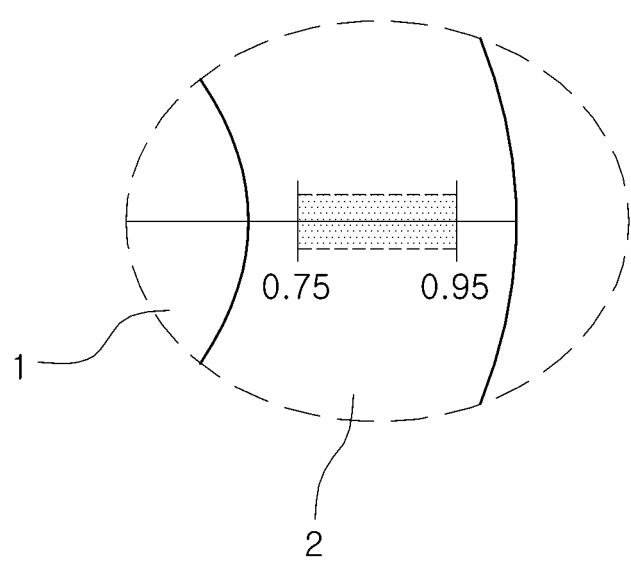
FIG. 2 is an enlarged view of area S of FIG. 1.

FIG. 2 is an enlarged view of area S of FIG. 1.

Referring to FIGS. 1 and 2, a dielectric composition according to an embodiment of the present invention may include a dielectric grain 10 having a perovskite structure represented by $ABO_3$. Here, when an imaginary line is drawn in a direction from a center C of the dielectric grain 10 to a grain boundary b thereof, the content of rare earth elements in a region corresponding to 75 to 95% of the dielectric grain 10 from the center C thereof may be 0.5 to 2.5 at %, based on 100 at % of a B-site ion.

Hereinafter, the dielectric composition according to the embodiment of the present invention will be described in detail.

According to the embodiment of the present invention, the dielectric composition may include the dielectric grain 10 having a perovskite structure represented by $ABO_3$.

In addition, the A may include one or more selected from the group consisting of barium (Ba), strontium (Sr), lead (Pb), and calcium (Ca), but is not limited thereto.

As the B, any material that can be situated in site B in the perovskite structure may be used, but is not particularly limited thereto, and examples thereof may include one or more selected from the group consisting of titanium (Ti) and zirconium (Zr).

The dielectric grain may include one or more selected from the group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$); and $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$), in which one or more rare earth elements are partially dissolved, but is not limited thereto.

Generally, as the dielectric grain included in the dielectric composition is finely-granulated and a dielectric layer of a multilayer ceramic electronic component manufactured using the dielectric grain has a reduced thickness, short circuit defects, reliability defects, and the like, may occur.

Moreover, it is difficult to perform dispersion at the time of preparing slurry using a fine-granulated dielectric powder, which may cause reliability degradation in the multilayer ceramic electronic component manufactured by using the dielectric composition.

In order to overcome deterioration in reliability, a dielectric grain having rare earth elements completely dissolved therein and a perovskite structure oxide as a base material may be preferably used.

That is, in order to solve short circuit defects, reliability defects, and the like, due to the dielectric layer of the multilayer ceramic electronic component having a reduced thickness, it is necessary to control the content of rare earth elements in the dielectric grain having a perovskite structure.

According to the embodiment of the present invention, when an imaginary line is drawn in a direction from the center C of the dielectric grain 10 to the grain boundary b thereof, the content of rare earth elements in a region corresponding to 75 to 95% of the dielectric grain 10 from the center C thereof may be 0.5 to 2.5 at %, based on 100 at % of the B-site ion.

The dielectric grain 10 may include a core 1 and a shell 2 and have a core-shell structure.

The content of rare earth elements may be a content thereof in a region corresponding to 75 to 95% of the dielectric grain 10 from the center C of the dielectric grain 10 when an imaginary line is drawn in the direction from the center C of the dielectric grain 10 to the grain boundary b thereof.

FIG. 1 shows a region corresponding to 75 to 95% of the dielectric grain 10 from the center C of the dielectric grain 10 when an imaginary line is drawn in the direction from the center C of the dielectric grain 10 to the grain boundary b thereof.

The imaginary line drawn in the direction from the center C of the dielectric grain 10 to the grain boundary b thereof is not particularly limited thereto, and for example, the imaginary line may be drawn from the center C of the dielectric grain 10 to the grain boundary b thereof in which the shell is thickest.

By controlling the content of rare earth elements to satisfy 0.5 to 2.5 at %, based on 100 at % of the B-site ion, short circuit defects, reliability defects, and the like, of the multilayer ceramic electronic component manufactured by using the dielectric composition including the dielectric grain can be solved.

If the content of rare earth elements is below 0.5 at %, based on 100 at % of the B-site ion, the dielectric grain 10 has a core-shell structure the same as a core-shell structure of a dielectric grain according to the related art, which may be ineffective in improvements in reliability.

Meanwhile, if the content of rare earth elements is above 2.5 at %, based on 100 at % of the B-site ion, a desired high dielectric constant may not be obtained.

According to the embodiment of the present invention, the content of rare earth elements in the region corresponding to 75 to 95% of the dielectric grain 10 from the center C thereof may be 0.05 to 2.0 times the content of rare earth elements in the center C of the dielectric grain 10.

The content of rare earth elements in the region corresponding to 75 to 95% of the dielectric grain 10 from the center C thereof is controlled to be 0.05 to 2.0 times the content of rare earth elements in the center C of the dielectric grain 10, whereby the multilayer ceramic electronic component manufactured using the dielectric grain 10 may secure a high dielectric constant and improved reliability.

If the content of rare earth elements in the region corresponding to 75 to 95% of the dielectric grain 10 from the center C thereof is less than 0.05 times the content of rare earth elements in the center C of the dielectric grain 10, improvements in reliability may not be obtained.

If the content of rare earth elements in the region corresponding to 75 to 95% of the dielectric grain 10 from the center C thereof is more than 2.0 times the content of rare earth elements in the center C of the dielectric grain 10, a desired high dielectric constant may not be obtained.

The content of rare earth elements in the center C of the dielectric grain is not particularly limited, and may be for example 0.05 to 2.0 at %, based on 100 at % of the B-site ion.

The rare earth elements may include a trivalent ion, but is not limited thereto.

The rare earth elements may not be particularly limited, and may include one or more selected from the group consisting of scandium (Sc), yttrium (Y), lanthanum (La), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru), for example.

The dielectric grain of the dielectric composition according to the embodiment of the present invention may be produced by the following method.

The perovskite powder is powder having a structure of $ABO_3$. In the embodiment of the present invention, a metal oxide is an element source corresponding to site B and a metal salt is an element source corresponding to site A.

First, a perovskite particle nucleus may be formed by mixing the metal salt and the metal oxide.

The metal oxide may be one or more selected from the group consisting of titanium (Ti) and zirconium (Zr).

Titania and zirconia are very easily hydrolysable, and thus, if they are mixed with pure water without additional additive, hydrous titanium or hydrous zirconium may be precipitated in a gel form.

The hydrous metal oxide may be washed to remove impurities therefrom.

More specifically, the hydrous metal oxide is filtered by pressure, to remove a residual solution, and then filtered while being washed with pure water, to remove impurities present on a particle surface.

Next, pure water and acid or a base may be added to the hydrous metal oxide.

The pure water may be put into hydrous metal oxide powder obtained after filtering, and then the mixture was stirred by a high-viscosity stirrer at a temperature of 0° C. to 60° C. for 0.1 to 72 hours, thereby preparing a hydrous metal oxide slurry.

Acid or a base may be added to the prepared slurry. Here, the acid or base may be used as a peptizing agent, and may be added in 0.00001 to 0.2 moles, based on the content of hydrous metal oxide.

The acid is not particularly limited as long as it is commonly used, and examples thereof may include hydrochloric acid, nitric acid, sulfuric acid, phosphoric acid, formic acid, acetic acid, polycarboxylic acid, and the like, which may be used alone or in combination of at least two thereof.

The base is not particularly limited as long as it is commonly used, and examples thereof may include tetramethyl ammonium hydroxide, tetra ethyl ammonium hydroxide, and the like, which may be used alone or in combination of at least two thereof.

The metal salt may be barium hydroxide or a combination of a rare earth salt and barium hydroxide.

The rare earth salt may be scandium (Sc), yttrium (Y), lanthanum (La), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), ruthenium (Ru) or the like, but are not limited thereto.

The forming of the perovskite particle nucleus may be performed at 60° C. to 150° C.

Next, the perovskite particle nucleus is input into a hydrothermal reactor and subjected to hydrothermal treatment, such that the perovskite particle nucleus may be grown in the hydrothermal reactor.

Next, an aqueous metal salt solution is inputted into the hydrothermal reactor by using a high-pressure pump, to prepare a mixture liquid. The mixture liquid is heated to obtain a dielectric grain having a perovskite structure represented by $ABO_3$.

The aqueous metal salt solution is not particularly limited, and may be, for example, one or more selected from the group consisting of nitrate and acetate.

Figure 3:
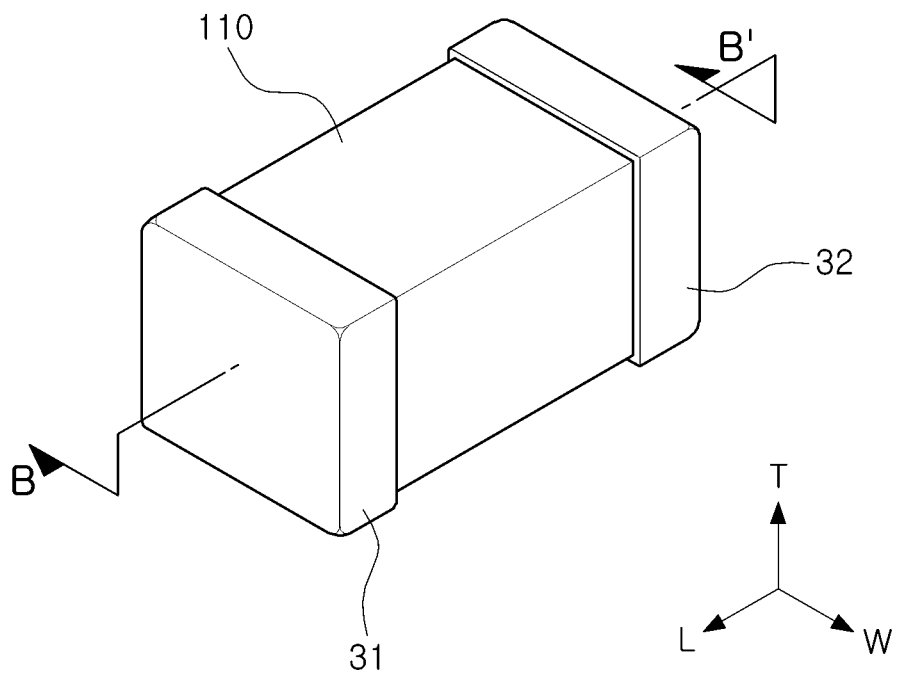
FIG. 3 is a perspective view schematically showing a multilayer ceramic capacitor according to an embodiment of the present invention.

FIG. 3 is a perspective view schematically showing a multilayer ceramic capacitor according to an embodiment of the present invention.

Figure 4:
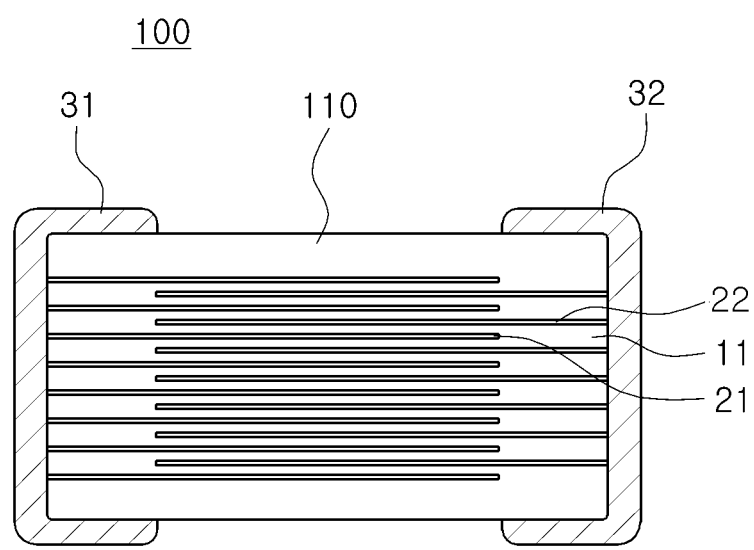
FIG. 4 is a cross-sectional view taken along line B-B' of FIG. 3.

FIG. 4 is a cross-sectional view taken along line B-B' of FIG. 3.

Referring to FIGS. 3 and 4, a multilayer ceramic electronic component according to an embodiment of the present invention may include: a ceramic body 110 including dielectric layers 11 each having an average thickness of 0.48 μm or less; and internal electrodes 21 and 22 disposed to face each other with the dielectric layer 11 therebetween within the ceramic body 110. Here, the dielectric layer 11 may include the dielectric composition, the dielectric composition including the dielectric grain 10 having a perovskite structure represented by $ABO_3$, in which when an imaginary line is drawn in a direction from the center C of the dielectric grain 10 to the grain boundary b thereof, the content of rare earth elements in a region corresponding to 75 to 95% of the dielectric grain 10 from the center C thereof may be 0.5 to 2.5 at %, based on 100 at % of the B-site ion.

Hereinafter, the multilayer ceramic electronic component according to the embodiment of the present invention, particularly, the multilayer ceramic capacitor, will be described, but the present invention is not limited thereto.

In the multilayer ceramic capacitor according to the embodiment of the present invention, "length direction", "width direction", and "thickness direction" will be defined as the 'L' direction, the 'W' direction, and the 'T' direction, of FIG. 3. Here, the 'thickness direction' may be used to have the same concept as a direction in which dielectric layers are laminated, that is, a 'lamination direction'.

According to the embodiment of the present invention, a raw material for forming the dielectric layer 11 is not particularly limited as long as sufficient capacitance can be obtained thereby. For example, the raw material may be a barium titanate ($BaTiO_3$) powder.

The multilayer ceramic capacitor manufactured by using the barium titanate ($BaTiO_3$) powder has a high room-temperature dielectric constant and excellent insulation resistance and withstand voltage characteristics, and thus, reliability thereof can be improved.

The multilayer ceramic capacitor according to the embodiment of the present invention may include the dielectric grain in which when an imaginary line is drawn in a direction from the center C of the dielectric grain to the grain boundary b thereof, the content of rare earth elements in a region corresponding to 75 to 95% of the dielectric grain from the center C thereof may be 0.5 to 2.5 at %, based on 100 at % of the B-site ion, such that the multilayer ceramic capacitor has a high room-temperature dielectric constant and excellent insulation resistance and withstand voltage characteristics, and thus, reliability thereof can be improved.

As a material for forming the dielectric layer 11, various ceramic additives, organic solvents, plasticizers, binders, dispersants, or the like may be added to powder, such as the barium titanate ($BaTiO_3$) powder, depending on the objects of the present invention.

The average thickness of the dielectric layer 11 may be, but is not particularly limited to, for example, 0.48 μm or less.

The dielectric composition according to the embodiment of the present invention has better effects when the average thickness of the dielectric layer 11 is 0.48 μm or less. That is, the multilayer ceramic capacitor manufactured by using the dielectric composition has excellent reliability when the average thickness of the dielectric layer is 0.48 μm or less.

The dielectric constant of the dielectric layer 11 may be, but is not particularly limited to, for example, 4000 or greater.

The other features of the present embodiment overlap the features of the dielectric grain according to the aforementioned embodiment of the present invention, and thus, descriptions thereof will be omitted.

A material for forming the first and second internal electrodes 21 and 22 is not particularly limited. For example, they may be formed by using a conductive paste made of one or more of silver (Ag), lead (Pb), platinum (Pt), nickel (Ni) and copper (Cu).

The multilayer ceramic capacitor according to the embodiment of the present invention may further include a first external electrode 31 electrically connected to the first internal electrode 21 and a second external electrode 32 electrically connected to the second internal electrode 22.

The first and second external electrodes 31 and 32 may be electrically connected to the respective first and second internal electrodes 21 and 22 so as to form capacitance, and the second external electrode 32 may be connected to a potential different from that of the first external electrode 31.

A material for forming the first and second external electrodes 31 and 32 is not particularly limited as long as the first and second external electrodes 31 and 32 can be electrically connected to the first and second internal electrodes 21 and 22 so as to form capacitance, and may include one or more selected from the group consisting of copper (Cu), nickel (Ni), silver (Ag), and silver-palladium (Ag—Pd).

Hereafter, the present invention will be described in detail with reference to examples, but is not limited thereto.

Examples of the present invention were manufactured by using a dielectric composition including a dielectric grain having a perovskite structure represented by $ABO_3$, in which, when an imaginary line is drawn in a direction from a center of the dielectric grain to a grain boundary thereof, a content of rare earth elements in a region corresponding to 75 to 95% of the dielectric grain from the center thereof may be 0.5 to 2.5 at %, based on 100 at % of a B-site ion.

Comparative Examples were manufactured by preparing a dielectric composition including a dielectric grain having the same composition as that of the examples of the present invention, except that numeral ranges were outside of the foregoing numeral ranges of the present invention.

Table 1 below shows results in which capacitance and dielectric loss were compared according to the content of rare earth elements in a different position of the dielectric grain.

The capacitance and the dielectric loss were measured at 1 kHz and 0.5V by using an LCR meter, after the dielectric composition was heated and then one hour had elapsed. Reliability evaluation was performed by counting the number of defective samples among 40 samples under the conditions of 130° C., 8V, and 4 hours.

Capacitances of the samples were measured, and the samples were determined to be good or bad, based on 2.68 as a minimum capacitance.

TABLE 1

Content of Rare Earth Elements in Different Position Of Dielectric Grain

| | Center of Grain (c) | | Region Corresponding to 0.75 to 0.95% from Center of Dielectric Grain | | Capacitance | Reliability Evaluation (Number of Defective Products/ 40 ea) |
|---|---|---|---|---|---|---|
| | Rare Earth Elements | Content (at %) | Rare Earth Elements | Content (at %) | | |
| 1 | Dy | 0.05 | Dy | 1.2 | 3.10 | 19 |
| 2* | Dy | 0.02 | Dy, Y | 0.4 | 3.33 | 34 |
| 3 | Dy | 0.2 | Dy | 0.5 | 3.22 | 18 |
| 4 | Dy | 0.4 | Dy, Ho | 2.5 | 2.76 | 10 |
| 5 | Dy | 0.8 | Dy, Y | 2.3 | 2.78 | 7 |
| 6 | Dy | 1.5 | Dy, Y | 2.0 | 2.70 | 5 |
| 7 | Dy | 2.0 | Dy | 1.0 | 2.71 | 6 |
| 8* | Dy | 2.5 | Dy, Y | 2.7 | 1.92 | 2 |
| 9 | Y | 0.1 | Dy, Y | 0.5 | 3.00 | 18 |
| 10 | Y | 1.0 | Dy, Y | 1.2 | 2.85 | 8 |
| 11* | Y | 2.1 | Dy, Y | 0.4 | 2.43 | 26 |
| 12 | Y | 0.6 | Y, Ho | 1.1 | 2.76 | 13 |
| 13 | Y | 1.8 | Y | 1.0 | 2.68 | 15 |
| 14 | Y | 0.05 | Y | 1.5 | 2.79 | 19 |
| 15* | Ho | 0.0 | Ho | 2.0 | 2.98 | 28 |
| 16 | Ho | 1.0 | Dy | 1.0 | 2.90 | 13 |
| 17* | Ho | 2.2 | Ho | 1.0 | 2.33 | 14 |

*Comparative Example

It can be seen from Table 1 above that each of Samples 1, 3 to 7, 9, 10, 12 to 14, and 16 was a multilayer ceramic capacitor manufactured by using the dielectric grain satisfying the numeral range of the present invention, and capacitance thereof was high and reliability thereof was excellent.

Whereas, it can be seen that each of Samples 2, 8, 11, 15, and 17 was outside of the numeral range of the present invention, and had defects in capacitance or reliability, or both capacitance and reliability.

Resultantly, the multilayer ceramic capacitor according to the embodiment of the present invention was manufactured by using a dielectric composition including a dielectric grain having a perovskite structure represented by $ABO_3$, in which, when an imaginary line is drawn in a direction from a center of the dielectric grain to a grain boundary thereof, rare earth elements in a region corresponding to 75 to 95% of the dielectric grain from the center thereof has a content of 0.5 to 2.5 at %, based on 100 at % of a B-site ion, and thus had a high room-temperature dielectric constant, high capacitance and excellent reliability.

As set forth above, according to the embodiments of the present invention, the multilayer ceramic electronic component manufactured using the dielectric composition can have excellent reliability and secure a high dielectric constant.

While the present invention has been shown and described in connection with the embodiments, it will be apparent to those skilled in the art that modifications and variations can be made without departing from the spirit and scope of the invention as defined by the appended claims.

What is claimed is:

1. A dielectric composition, comprising a dielectric grain having a perovskite structure represented by $ABO_3$,
   when a minor axis of the dielectric grain is a conceptual line between two peak points of the dielectric grain in a shorter distance thereof, and a major axis of the dielectric grain is a conceptual line between two peak points of the dielectric grain in a longer distance thereof, a center of the dielectric grain is an intersection point of the minor axis and the major axis, wherein, when an imaginary line is drawn in a direction from the center of the dielectric grain to a grain boundary thereof, a content of rare earth elements in a center portion of the dielectric grain is 0.05 to 2.0 at %, content of rare earth elements across an entire region corresponding to 75 to 95% of the dielectric grain from the center of the dielectric grain is 0.5 to 2.5 at %, based on 100 at % of a B-site ion, and the content of rare earth elements in the region corresponding to 75 to 95% of the dielectric grain from the center of the dielectric grain is 0.05 to 2.0 times a content of rare earth elements in the center portion of the dielectric grain.

2. The dielectric composition of claim 1, wherein the A includes one or more selected from a group consisting of barium (Ba), strontium (Sr), lead (Pb), and calcium (Ca).

3. The dielectric composition of claim 1, wherein the B includes one or more selected from a group consisting of titanium (Ti) and zirconium (Zr).

4. The dielectric composition of claim 1, wherein the rare earth elements include a trivalent ion.

5. The dielectric composition of claim 1, wherein the rare earth elements include one or more selected from a group consisting of scandium (Sc), yttrium (Y), lanthanum (La), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru).

6. The dielectric composition of claim 1, wherein the dielectric grain includes one or more selected from a group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$); and $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$), in which one or more rare earth elements are partially dissolved.

7. A multilayer ceramic electronic component, comprising:
a ceramic body including dielectric layers each having an average thickness of 0.48 μm or less; and
internal electrodes disposed to face each other with the dielectric layer therebetween within the ceramic body,
wherein the dielectric layer includes a dielectric composition, the dielectric composition including a dielectric grain having a perovskite structure represented by $ABO_3$, when a minor axis of the dielectric grain is a conceptual line between two peak points of the dielectric grain in a shorter distance thereof, and a major axis of the dielectric grain is a conceptual line between two peak points of the dielectric grain in a longer distance thereof, a center of the dielectric grain is an intersection point of the minor axis and the major axis, in which, when an imaginary line is drawn in a direction from the center of the dielectric grain to a grain boundary thereof, a content of rare earth elements in a center portion of the dielectric grain is 0.05 to 2.0 at %, a content of rare earth elements across an entire region corresponding to 75 to 95% of the dielectric grain from the center of the dielectric grain is 0.5 to 2.5 at %, based on 100 at % of a B-site ion, and the content of rare earth elements in the region corresponding to 75 to 95% of the dielectric grain from the center of the dielectric grain is 0.05 to 2.0 times a content of rare earth elements in the center portion of the dielectric grain.

8. The multilayer ceramic electronic component of claim 7, the A includes one or more selected from a group consisting of barium (Ba), strontium (Sr), lead (Pb), and calcium (Ca).

9. The multilayer ceramic electronic component of claim 7, wherein the B includes one or more selected from a group consisting of titanium (Ti) and zirconium (Zr).

10. The multilayer ceramic electronic component of claim 7, wherein the rare earth elements include a trivalent ion.

11. The multilayer ceramic electronic component of claim 7, wherein the rare earth elements include one or more selected from a group consisting of scandium (Sc), yttrium (Y), lanthanum (La), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru).

12. The multilayer ceramic electronic component of claim 7, wherein the dielectric grain includes one or more selected from a group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$); and $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 \leq y \leq 0.20$), and $Ba_m(Ti_{1-x}Zr_x)O_3$ ($0.995 \leq m \leq 1.010$, $x \leq 0.10$), in which one or more rare earth elements are partially dissolved.

13. The multilayer ceramic electronic component of claim 7, wherein the dielectric layer has a dielectric constant of 4000 or greater.

* * * * *